United States Patent [19]

Jilani

[11] 4,099,576
[45] Jul. 11, 1978

[54] HIGH-SPEED AGRICULTURAL DISC
[75] Inventor: Atiq A. Jilani, Oak Lawn, Ill.
[73] Assignee: Borg-Warner Corporation, Chicago, Ill.
[21] Appl. No.: 810,125
[22] Filed: Jun. 27, 1977
[51] Int. Cl.² .................................... A01B 15/16
[52] U.S. Cl. .................................. 172/555; 172/604
[58] Field of Search ............... 172/604, 567, 603, 166, 172/556, 540, 548, 555, 177; 301/64 SD, 64 R, 63 R

[56] References Cited

U.S. PATENT DOCUMENTS

| 9,169 | 4/1880 | Johnson | 172/604 |
|---|---|---|---|
| 29,342 | 9/1898 | McGuire | 432/74 |
| D. 83,811 | 3/1931 | Karl | D15/29 |
| 514,210 | 2/1894 | Clark | 172/583 |
| 865,294 | 9/1907 | Clark | 172/555 X |
| 1,113,241 | 10/1914 | Niesz | 172/604 X |
| 1,195,710 | 8/1916 | Nichols | 172/555 X |
| 1,214,882 | 2/1917 | Bessant | 172/574 |
| 1,879,193 | 9/1932 | Graham | 172/557 |
| 2,686,395 | 8/1954 | Taylor | 172/555 |
| 3,213,514 | 10/1965 | Evans | 172/555 X |

FOREIGN PATENT DOCUMENTS 986,352   3/1965   United Kingdom ................. 172/177

Primary Examiner—Richard J. Johnson
Attorney, Agent, or Firm—James E. Tracy

[57] ABSTRACT

By providing a circular, dished agricultural disc with peripheral V-shaped notches and intervening ovate-shaped openings, the disc may be operated at relatively high speeds while still achieving vigorous cutting, stirring and mixing of the soil. At the same time, excessive throwing of soil is avoided, thereby preventing soil accumulation into high ridges with wide furrows inbetween.

11 Claims, 4 Drawing Figures

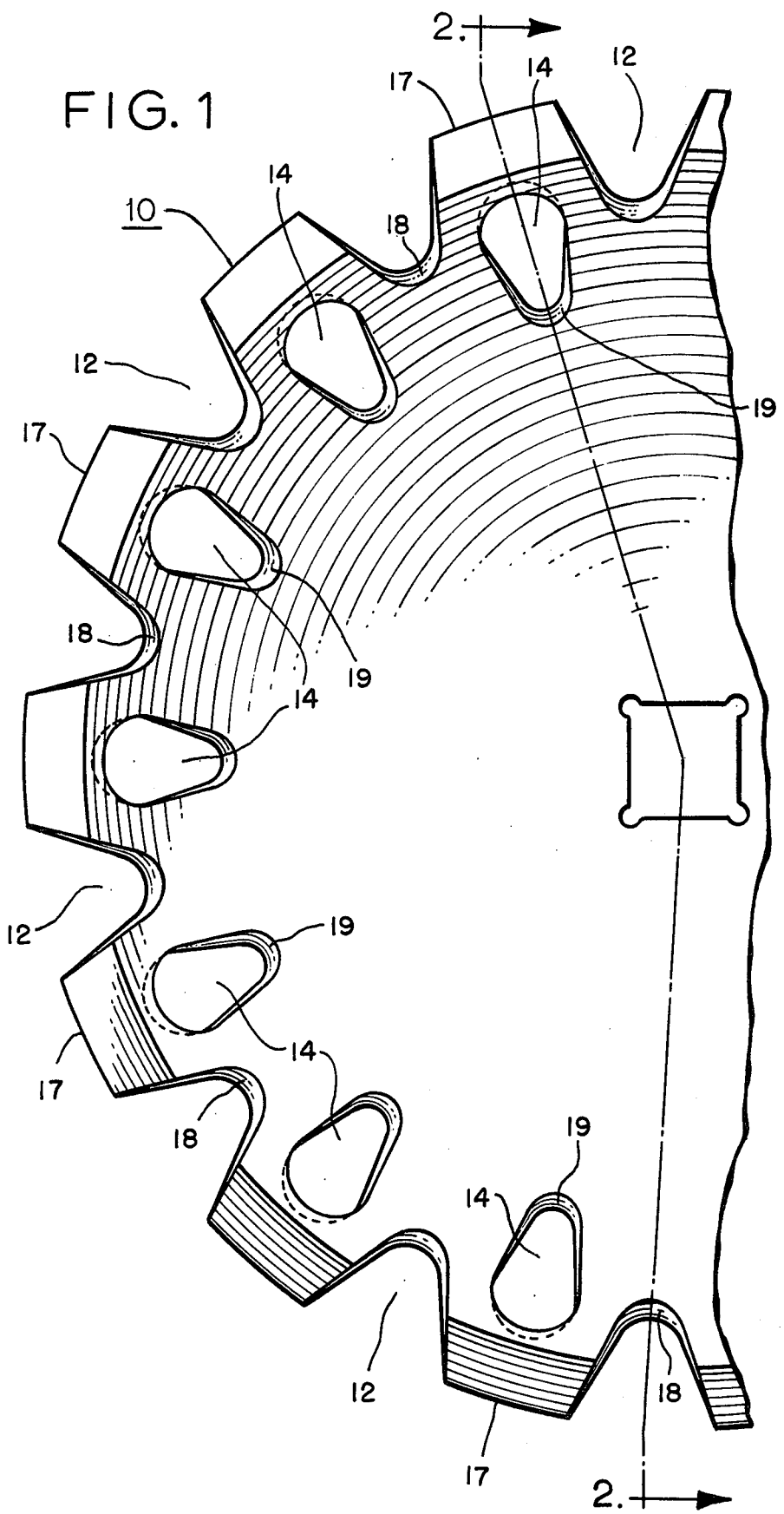
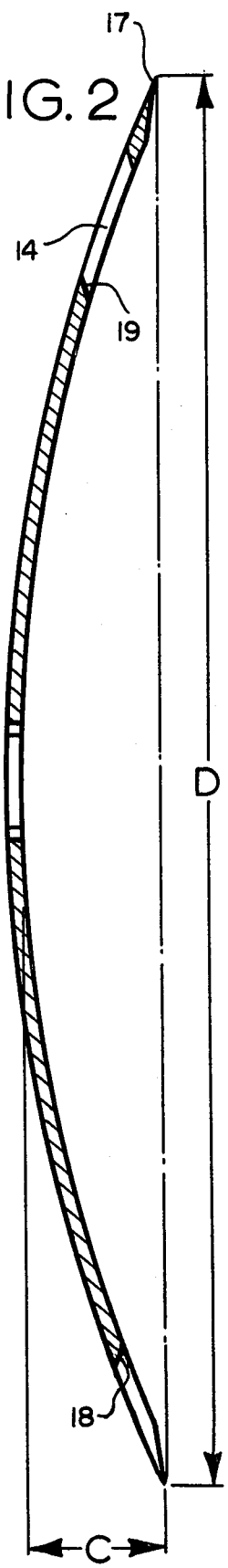
FIG. 1
FIG. 2

HIGH-SPEED AGRICULTURAL DISC

BACKGROUND OF THE INVENTION

This invention relates to an earth-working concave agricultural disc useful, for example, for plowing and harrowing, cutting through and mixing ground trash or crop residue, preparing seedbeds during primary and secondary tillage operations, land clearing and site preparation, and preparing roadbeds for highway.

A disc implement or rig usually includes at least one gang of concave or dished circular steel discs with tapered or beveled peripheral edges, all of the discs sharing a common axis. Such an implement is pulled over the earth by a tractor with the common axis of the disc gang at an angle of less than 90° from the line of forward movement of the tractor. The discs, although tending to roll or rotate as they are pulled forward, penetrate into and break up the soil, the loose soil riding up and across the concave surfaces and turning over or inverting. When tillage is performed for agricultural purposes, the objective is usually to provide a favorable soil environment for the germination and growth of a given crop. Good soil tilth is most important. Ideally, the best tilth quality is achieved when the soil is broken up or pulverized into small pieces that allow free access to air and water.

By employing cutaway notches or recesses on the periphery of each disc, the trash cutting capabilities are improved. Notched discs have better penetration because of their reduced peripheral contact area and cut heavy trash more readily since they tend to pull it under instead of pushing it ahead. The penetrating capability diminishes, however, as the disc is used and the notches wear out. As the disc works the soil, its diameter reduces from loss of material due to friction and the notches gradually disappear.

In the past, tractors pulling disc implements usually could not travel at speeds higher than about three miles per hour, and at that relatively slow discing speed the soil could be satisfactorily tilled. However, with the advancement in tractor technology, new and higher horsepower tractors are now available that can pull disc implements at much greater speeds, for example as high as ten miles per hour. Prior agricultural discs suffer from a number of disadvantages and deficiencies which render them unsatisfactory for high speed earth cutting. When conventional discs are pulled at high speeds, the concavity of the discs causes the soil to be thrown outwardly to such an extent that the ground becomes unleveled, with alternate high ridges and wide deep furrows. Of course, this tilth condition or quality is entirely unsatisfactory. Moreover, the undesired soil throwing and accumulation gives rise to soil erosion.

Another problem that occurs when prior conventional discs are pulled at high speeds is that there is a tendency to plow at a depth less than intended. As the discing speed increases over three miles per hour, disc penetration becomes quite shallow. In the past this was remedied by increasing the vertical load, usually by adding weights to the rig. With a greater vertical force, the requisite penetration could be attained, even though the degree of tilth is still entirely unsatisfactory. Moreover, the additional weight increases the draft force required to pull the discs, resulting in wasteful energy consumption.

Another disadvantage of using supplemental weight to obtain the required penetration is that undesired soil compaction occurs. Of course, the greater the soil is compacted, the more difficult it is for seeds to germinate. In addition, compacted soil is hard to work with next time the field is tilled.

The present invention provides a circular, dished earth-cutting agricultural disc, with peripheral notches, which lends itself to high speed use and overcomes all of the above problems and shortcomings. At high discing speeds, the soil may be cultivated without excessive throwing thereof and the resultant formation of furrows with spaced interruptions of accumulated soil, as is common with prior discs. The notched disc of the present invention has improved penetration capability, requiring less vertical force to penetrate to a given desired depth, as a consequence of which less draft force must be pulled by the tractor, thus conserving energy. Furthermore, by needing less weight for penetration, there is less compaction of soil.

Moreover, and this advantage is present even at low discing speeds, the unique geometric configuration of the present disc achieves vigorous stirring and mixing of soil to an extent and at a depth not attainable with prior discs at any speed.

An additional advantage of the notched disc of the invention is that excellent penetrating capability is retained even as the peripheral notches wear out completely and the disc's diameter decreases to the bottoms of the notches. The disc, therefore, has a much longer functional life than any notched disc developed heretofore.

SUMMARY OF THE INVENTION

The circular, dished earth-cutting agricultural disc of the invention has a series of equally-spaced, generally V-shaped notches around its circular periphery, with a radially-extending, generally ovate-shaped opening between each pair of adjacent notches. The openings are oriented so that their wider ends are radially outermost and extend outwardly beyond the bottoms of the notches. Optimum tillage results and tilth quality are achieved when the ratio of disc diameter to concavity is in the range from 9 to 13.

DESCRIPTION OF THE DRAWINGS

The features of the invention which are believed to be novel are set forth with particularity in the appended claims. The invention, together with further advantages and features thereof, may best be understood, however, by reference to the following description in conjunction with the accompanying drawings in which:

FIG. 1 is a partial plan view of a dished agricultural disc, as viewed from its concave side, constructed in accordance with one embodiment of the invention;

FIG. 2 is a sectional view taken along the plane of section line 2—2 in FIG. 1;

DESCRIPTION OF THE ILLUSTRATED EMBODIMENTS

Figure 3:
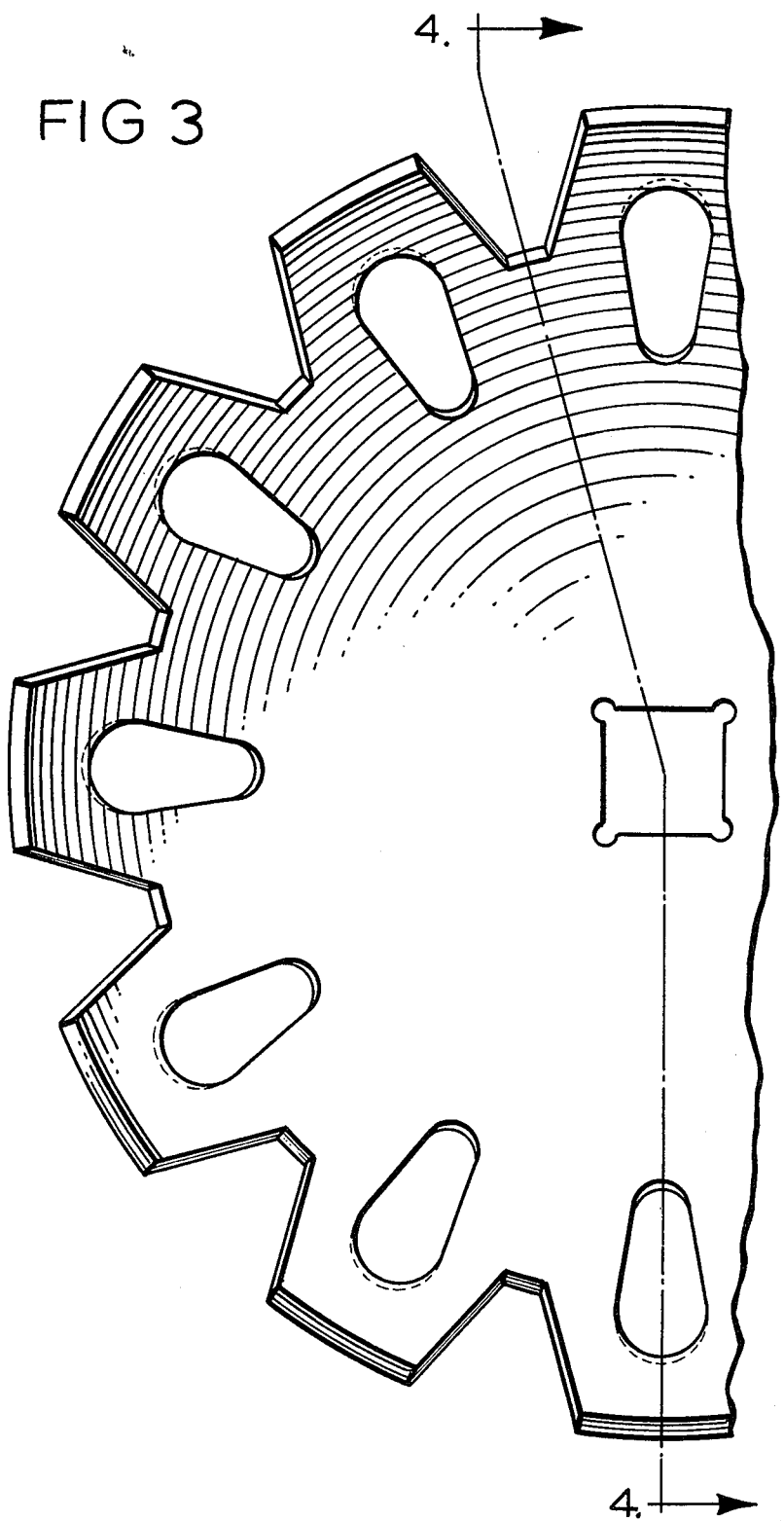
FIG. 3 shows another dished agricultural disc, as viewed from its concave side, constructed in accordance with another embodiment of the invention; and, FIG. 4 is a sectional view taken along the plane of section line 4—4 in FIG. 3.

In the embodiment of FIGS. 1 and 2, disc 10, which is preferably made of high carbon steel, has a dished configuration that is generally spherical, namely it constitutes a section of a sphere, although any appropriate concavo-convex shape may be employed. For best results, however, with the unique geometric shape of the peripheral area of disc 10 there is a preferred relationship between the disc diameter D and the disc's concavity, which is reflected by dimension C. Of course, dimension C is directly proportional to and represents the amount of concavity. More specifically, it has been found that optimum results are obtained when the ratio of disc diameter to concavity (or D/C) is in the range from 9 to 13. For example, the disc illustrated in FIGS. 1 and 2 may have a diameter of approximately 33 inches, in which case the concavity dimension C should be about 3 inches. Such a disc would also preferably have a thickness of around .3 inch.

Equally-spaced, generally V-shaped notches 12 are cutout around the circular periphery of disc 10, and equidistant between each adjacent pair of notches is a radially-extending generally ovate or teardrop-shaped opening 14, the wider end of the opening extending radially outwardly to a point beyond the rounded bottoms of notches 12. Preferably, the radial length of each opening or cutout 14 is greater than the radial depth of each notch. The peripheral edges of the arcuate shaped unnotched portions 17 and of the notches 12 are tapered or beveled to provide cutting edges. Preferably, the tapers are made by shearing operations. In the illustrated case, the sheared surfaces are provided on the disc's concave side, but such surfaces could be made on the convex side instead, or even on both sides. Note that the sheared surfaces 18, on the edges of notches 12, meet the convex side of disc 10 at variable acute angles to form optimum cutting edges within each notch.

It has been found that the disc illustrated in FIGS. 1 and 2 achieves excellent tillage results and tilth quality at tractor speeds as high as 10 miles per hour. With the D/C ratio in the 9-13 range, the disc cuts or digs beneath the earth's surface and the loose soil moves up and across the concave surface of the disc, inverting or turning over. At the same time, the V-shaped notches 12, in conjunction with the ovate-shaped openings 14, accomplish vigorous cutting, stirring and mixing of the soil, as a result of which the soil is thoroughly and uniformly pulverized. Furthermore, and of great importance, notches 12 and openings 14 allow the soil to move in the disc's axial direction, thereby preventing soil accumulation to the side of the disc and leaving the ground leveled. Until the present invention, it was not possible to obtain a satisfactory penetration while providing excellent pulverization at high discing speeds.

A feature of the invention resides in the capability of disc 10 to stir the soil by the movement thereof in transverse directions at surface and sub-surface levels. Notches 12 and openings 14 partially release the back pressure on the convex side of disc 10 and increase the suction on the concave side for transverse movement of soil. The notches and openings stir the soil as the disc rotates, producing a better microclimate for a seedbed than is possible with prior discs. To explain further, when the V-shaped notches 12 enter the soil under pressure of vertical force, the soil breaks loose and openings 14 allow some of that soil to move axially through the openings, thereby further breaking up the soil to improve its texture. Each notch penetrates below the usual depth of cultivation, moving the soil in a transverse direction at surface and sub-surface levels and raising relatively hard, cloggy soil to the top, thereby improving the seed germination quality of the soil. Since the wider ends of cutouts 14 penetrate deeper than the narrow ends, there is more stirring of the deeper soil than the top soil which is an excellent characteristic for a seedbed. Since the back pressure on the convex side of disc 10 is a major component of the wear process, a reduction in such back pressure, which is accomplished by notches 12 and openings 14, results in a reduction of wear.

Since the disc has such superior penetrating capability, even at high speeds, less vertical force is needed to hold it to a given depth and this means less weight must be pulled by the tractor. Hence, less draft force and horsepower are needed to perform the same work, resulting in a conservation of energy. In addition, with less vertical force required to hold the disc to a desired depth, there is less compaction of soil.

Another feature of the invention is that disc 10 effectively has a dual set of notches. As one set wears out, a second set of notches automatically emerges. To elaborate, when the disc periphery wears down to the bottoms of notches 12, openings 14 automatically convert to generally V-shaped notches, thereby substantially extending the functional life of the disc. Until the present invention, it was not possible to provide a new set of notches as a disc wore out. Preferably, openings 14 are made by a shearing operation that leaves a sheared surface 19 which meets the disc's convex side at variable acute angles to provide a good cutting edge when the openings are transformed into notches.

Figure 4:
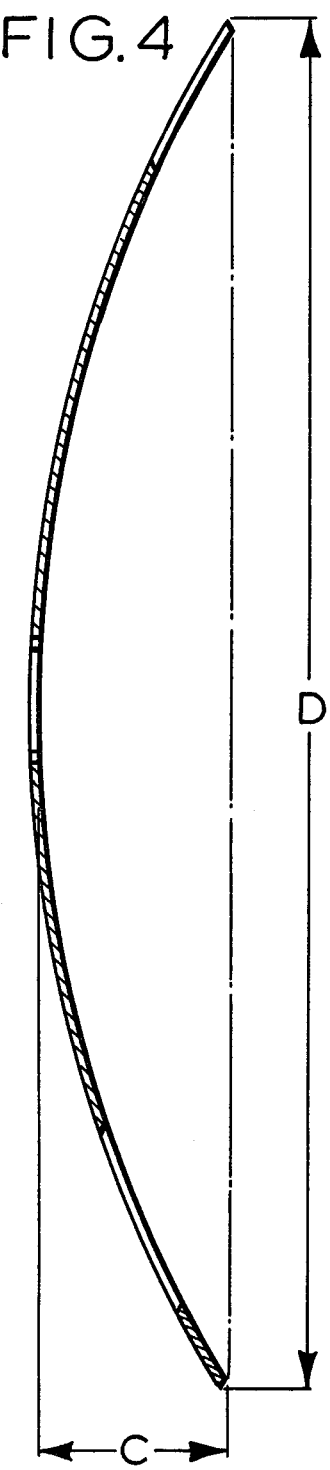

The disc shown in FIGS. 3 and 4 is somewhat similar to and exhibits all of the features and advantages of the embodiment of FIGS. 1 and 2. The only significant difference is that the peripheral notches in the embodiment of FIGS. 3 and 4 are flat-bottomed rather than rounded as in the first embodiment. Flat-bottomed notches are advantageous and have excellent cutting capability since they have more cutting edge per unit of notch area than prior discs. It has been found that when the disc of FIGS. 3 and 4 is given a diameter of around 28 inches, the concavity dimension C should be approximately 2.66 inches. The thickness would preferably be about 0.25 inch.

The invention provides, therefore, a unique high-speed, earth-working agricultural disc having excellent penetration, tilling, soil inverting, stirring, mixing and pulverizing capabilities without throwing the soil to one side and creating high ridges of soil accumulation with intervening deep furrows.

While particular embodiments of the invention have been shown and described, modifications may be made, and it is intended in the appended claims to cover all such modifications as may fall within the true spirit and scope of the invention.

I claim:

1. A circular, dished earth-cutting agricultural disc having a series of equally-spaced, generally V-shaped notches around its circular periphery, with a radially-extending, generally ovate-shaped opening between each pair of adjacent notches, the wider end of each opening being radially outermost and extending outwardly beyond the bottoms of the notches.

2. An agricultural disc according to claim 1 wherein the bottom of each V-shaped peripheral notch is rounded.

3. An agricultural disc according to claim 1 wherein each V-shaped peripheral notch is flat bottomed.

4. An agricultural disc according to claim 1 wherein the radial length of each opening is greater than the radial depth of each notch.

5. An agricultural disc according to claim 1 whose ratio of disc diameter to concavity is in the range from 9 to 13.

6. An agricultural disc according to claim 1 wherein each unnotched peripheral portion is arcuate shaped and tapered to form a cutting edge.

7. An agricultural disc according to claim 1 wherein the edge of each notched portion is tapered to provide a cutting edge.

8. An agricultural disc according to claim 1 wherein the edge of each notched portion is tapered to provide a tapered surface which meets one side of the disc at a variable acute angle to form a cutting edge.

9. An agricultural disc according to claim 8 wherein the tapered surfaces are sheared surfaces.

10. An agricultural disc according to claim 1 wherein the edge of each ovate-shaped opening is tapered to provide a tapered surface which meets one side of the disc at a variable acute angle to form a cutting edge.

11. An agricultural disc according to claim 1 wherein the narrow end of each ovate-shaped opening is radially inward with respect to the bottoms of the peripheral notches, the openings forming a second set of generally V-shaped notches when the disc wears down to the bottoms of the peripheral notches.

* * * * *